May 25, 1926.
J. STURROCK
OIL TRAP FOR ROTARY ENGINES
Filed July 31, 1925
1,585,700
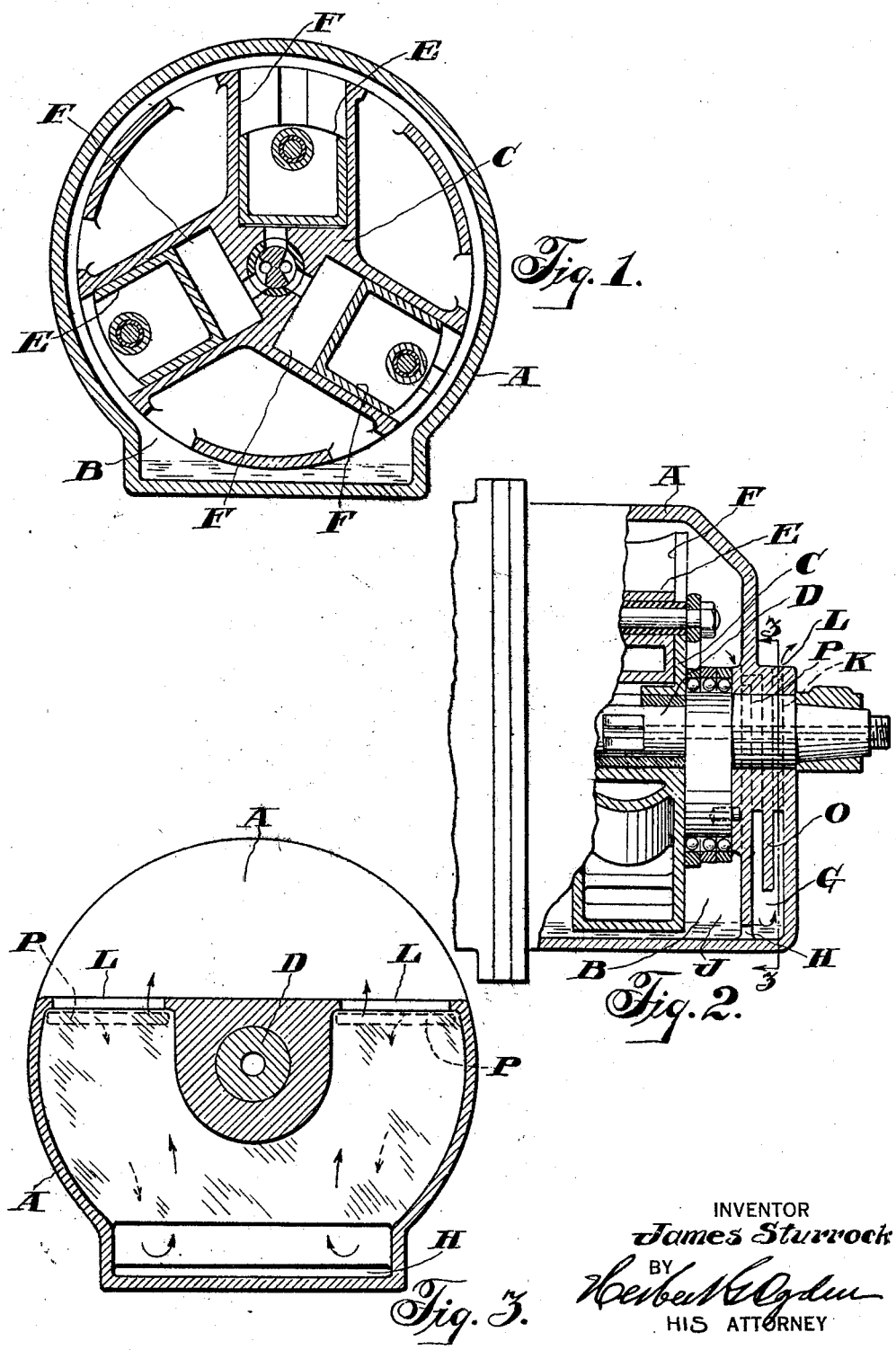
INVENTOR
James Sturrock
BY
Herbert G. Ogden
HIS ATTORNEY Patented May 25, 1926.

1,585,700

UNITED STATES PATENT OFFICE.

JAMES STURROCK, OF ATHENS, PENNSYLVANIA, ASSIGNOR TO INGERSOLL-RAND COMPANY, OF JERSEY CITY, NEW JERSEY, A CORPORATION OF NEW JERSEY.

OIL TRAP FOR ROTARY ENGINES.

Application filed July 31, 1925. Serial No. 47,246.

This invention relates to an oil trap for rotary engines, but more particularly to a device for preventing the oil or other lubricant from being carried out to atmosphere from the main portion of the motor casing.

The objects of the invention are to enable the lubricant to be separated from the air in a simple and efficient manner and permit the air under such pressure as is created in the motor casing to escape to atmosphere while the oil is separated and falls back into the lubricant chamber to be used over again in the motor chamber.

The oil or lubricant trap having a tortuous passage therethrough for carrying out the objects of the invention may conveniently be built into the casing of the machine and is primarily adapted for a rotary engine in which the rotary power member rotates about a horizontal axis.

Only so much of the moving parts of a rotary engine are illustrated as will serve to make the invention clear, and in the drawings—

Figure 1 is a diagrammatic transverse sectional view through a rotary cylinder motor, Figure 2 is a longitudinal sectional elevation partly broken away, showing the oil trap, and Figure 3 is a transverse sectional elevation on the line 3—3 of Figure 2 looking in the direction of the arrows.

Referring to the drawings, the engine or motor casing A has a main portion or chamber B in which the rotary power member C rotates about the horizontal shaft D. The rotary power member may be of any suitable type and in this instance pistons E are indicated reciprocating in the cylinders F causing rotation of the main cylinder member by means of which power is transmitted to a suitable driving shaft (not shown). The pressure fluid for operating the pistons and the cylinders may be compressed air or other suitable motive fluid.

A lubricant chamber G as shown is located at one side of the main portion of the engine casing and communicates at its bottom with said main portion through the aperture or apertures H. Lubricant, as for instance, lubricating oil J in the oil chamber G and in the bottom of the main portion B of the casing seals the aperture or apertures H and thus oil in the bottom of the casing is carried upwardly for lubricating purposes due to the action of the power member.

A passage or passages K leading upwardly through the casing from the oil chamber G communicate with the atmosphere at the vent or vents L and a baffle O of which there may be one or more extends downwardly into the oil chamber G. At the opposite side of the baffle O ports or passages P communicate with the main portion of the engine casing at points at least as high as the axis of rotation of the power member so that air and oil pass from a region adjacent the axis of rotation downwardly into the oil chamber G and over the baffle O and then upwardly to atmosphere at the vents L. The pressure created by the rotation of the power member in the casing causes a flow of lubricant carrying air out through the tortuous passage formed in the oil chamber and in its passage the oil is separated from the air and falls back into the oil chamber so that the oil is prevented from being carried out to atmosphere.

The device is simple and efficient and effectually prevents the loss of oil and at the same time vents the motor casing.

I claim:

1. The combination of a casing, a rotary member rotatable about a horizontal axis within the main portion of the casing, a lubricant chamber at one side communicating at its bottom with the main portion of the casing, a plate in said lubricant chamber dividing a substantial upper portion of said chamber into two compartments, a passage leading from the main casing at a point near the axis of rotation into one of the said compartments, and a vent to atmosphere leading from the other of the said compartments, whereby a tortuous passage is formed for the escape of pressure fluid trapped within the said main casing.

2. The combination of a casing, a rotary member rotatable about a horizontal axis within the main portion of the casing, a lubricant chamber at one side communicating at its bottom with the main portion of the casing, a baffle plate in said lubricant chamber at right angles to the axis of rotation, dividing the upper portion of the said chamber into two compartments, ports leading from the main portion of the casing at a point near the axis of rotation into the top of one of the said compartments, and a vent to atmosphere from the top of the other of the said compartments, whereby a tortuous passage is provided through the said lubricant chamber for the escape to atmosphere of oil bearing pressure fluid trapped in the said main casing.

In testimony whereof I have signed this specification.

JAMES STURROCK.